United States Patent
Hiyoshi et al.

(10) Patent No.: US 12,208,659 B2
(45) Date of Patent: Jan. 28, 2025

(54) VEHICLE AND METHOD FOR CONTROLLING VEHICLE

(71) Applicants: TOYOTA JIDOSHA KABUSHIKI KAISHA, Toyota (JP); SUBARU CORPORATION, Tokyo (JP)

(72) Inventors: Masatoshi Hiyoshi, Toyota (JP); Yoshio Hasegawa, Toyota (JP); Haruka Tsuruta, Toyota (JP); Makoto Ikegami, Obu (JP); Kazuya Fuke, Tokyo (JP)

(73) Assignees: TOYOTA JIDOSHA KABUSHIKI KAISHA, Toyota (JP); SUBARU CORPORATION, Tokyo (JP)

( * ) Notice: Subject to any disclaimer, the term of this patent is extended or adjusted under 35 U.S.C. 154(b) by 287 days.

(21) Appl. No.: 17/901,291

(22) Filed: Sep. 1, 2022

(65) Prior Publication Data

US 2023/0130590 A1    Apr. 27, 2023

(30) Foreign Application Priority Data

Oct. 25, 2021 (JP) .................. 2021-173720

(51) Int. Cl.
*B60H 1/00* (2006.01)

(52) U.S. Cl.
CPC ..... *B60H 1/00278* (2013.01); *B60H 1/00335* (2013.01); *B60H 1/00878* (2013.01); *B60H 2001/00961* (2019.05)

(58) Field of Classification Search
CPC ............ B60H 1/00278; B60H 1/00335; B60H 1/00878; B60H 2001/00961; B60S 1/54; B60S 1/023
See application file for complete search history.

(56) References Cited

U.S. PATENT DOCUMENTS

2012/0297805 A1    11/2012   Kamada et al.

FOREIGN PATENT DOCUMENTS

| CN | 111688544 A | * | 9/2020 | ......... B60H 1/00271 |
| JP | 5392298 B2 | | 1/2014 | |

OTHER PUBLICATIONS

English language translation of CN111688544 to Yao. Translated Aug. 2024. (Year: 2020).*

* cited by examiner

Primary Examiner — Cassey D Bauer
(74) Attorney, Agent, or Firm — Oliff PLC

(57) ABSTRACT

A vehicle includes a battery for traveling; an air conditioner that includes a defroster mode and that is configured to air-condition a vehicle cabin using a refrigeration cycle; a battery cooler configured to cool the battery with a coolant that is cooled by heat exchange with a refrigerant flowing through the air conditioner; and a control unit configured to control the air conditioner and the battery cooler. In a case where a temperature of the battery is higher than a reference temperature, the control unit operates the battery cooler and controls the air conditioner such that the air conditioner operates in the defroster mode when the vehicle is moving, and the control unit operates the battery cooler and stops the air conditioner when the vehicle is stopped.

7 Claims, 5 Drawing Sheets

< WITH DEFROSTER REQUEST >

< WITHOUT DEFROSTER REQUEST >

VEHICLE AND METHOD FOR CONTROLLING VEHICLE

CROSS-REFERENCE TO RELATED APPLICATION

This application claims priority to Japanese Patent Application No. 2021-173720 filed on Oct. 25, 2021, incorporated herein by reference in its entirety.

BACKGROUND

1. Technical Field

The present disclosure relates to a vehicle and a method for controlling a vehicle, and more specifically to a technique of controlling a vehicle including a battery for traveling.

2. Description of Related Art

A vehicle configuration has been proposed in which an in-vehicle heat pump air conditioner and a cooling system for a battery for traveling can be controlled cooperatively. A battery cooler disclosed in Japanese Patent No. 5392298 (JP 5392298 B) determines the priority given to cooling a battery according to the temperature of a refrigerant for cooling the battery or the temperature of the battery. In this cooler, as the priority given to cooling the battery increases, a target rotational speed of an electric compressor included in an air conditioner is increased.

SUMMARY

In many countries, installation of a defroster is required by law. When a defroster is used, the air-conditioned air from an air conditioner is blown toward a window glass (particularly the windshield). Fogging of the window glass can thus be reduced. A defroster is not particularly considered in the battery cooler disclosed in JP 5392298 B.

The present disclosure harmonizes cooling of a battery with a defrost function.

(1) An aspect of the disclosure relates to a vehicle including a battery for traveling; an air conditioner; a battery cooler; and a control unit configured to control the air conditioner and the battery cooler. The air conditioner includes a defroster mode in which air-conditioned air is blown toward a window glass, and the air conditioner is configured to air-condition a vehicle cabin using a refrigeration cycle. The battery cooler is configured to cool the battery with a coolant that is cooled by heat exchange with a refrigerant flowing through the air conditioner. In a case where a temperature of the battery is higher than a reference temperature, the control unit operates the battery cooler and controls the air conditioner such that the air conditioner operates in the defroster mode when the vehicle is moving, and the control unit operates the battery cooler and stops the air conditioner when the vehicle is stopped.

(2) In the case where the temperature of the battery is higher than the reference temperature, the control unit may set a cooling amount of the battery cooled by the battery cooler to a first cooling amount when the vehicle is moving, and may set the cooling amount of the battery cooled by the battery cooler to a second cooling amount when the vehicle is stopped. The second cooling amount may be larger than the first cooling amount.

In the above configuration (1), when the vehicle is moving, the air conditioner is controlled to operate in the defroster mode to provide sufficient visibility for a user (driver) of the vehicle. On the other hand, the air conditioner is stopped when the vehicle is stopped. In the above configuration (2), the second cooling amount when the vehicle is stopped is larger than the first cooling amount when the vehicle is moving. With each of the above configurations (1), (2), the cooling of the battery and the defrost function can therefore be harmonized.

(3) When the temperature of the battery is lower than the reference temperature, the control unit may set the cooling amount of the battery cooled by the battery cooler to a third cooling amount. The first cooling amount may be larger than the third cooling amount.

With the above configuration (3), the cooling amount of the battery is set to a larger value in the case where the battery temperature is higher than the reference temperature, including the case where the vehicle is moving, than in the case where the battery temperature is lower than the reference temperature. As a result, the battery can be reliably protected.

(4) The vehicle may further include an operation panel that accepts a user operation of selecting an operation mode of the air conditioner. When the temperature of the battery is higher than the reference temperature, the control unit may control the air conditioner regardless of the user operation accepted by the operation panel.

(5) The air conditioner may further include at least one operation mode other than the defroster mode. In the case where the temperature of the battery is higher than the reference temperature, when the vehicle is moving, the control unit may operate the air conditioner in the defroster mode and prohibit operation of the air conditioner in the at least one operation mode.

With each of the above configurations (4), (5), the cooling of the battery and the defrost function can be harmonized regardless of the user operation. The comfort of the user in the vehicle cabin can also be improved.

(6) The at least one operation mode may include a face mode in which the air-conditioned air is blown toward a position of a face or a chest of a user sitting in a seat, and a foot mode in which the air-conditioned air is blown toward feet of the user. When the temperature of the battery is lower than the reference temperature, the control unit may allow operation of the air conditioner in the face mode or the foot mode in addition to the defroster mode.

With the above configuration (6), the comfort of the user in the vehicle cabin can be improved by operating the air conditioner in the face mode or the foot mode.

(7) Another aspect of the present disclosure relates to a method for controlling a vehicle. The vehicle includes a battery for traveling, an air conditioner, and a battery cooler. The air conditioner includes a defroster mode in which air-conditioned air is blown toward a window glass, and the air conditioner is configured to air-condition a vehicle cabin using a refrigeration cycle. The battery cooler is configured to cool the battery with a coolant that is cooled by heat exchange with a refrigerant flowing through the air conditioner. The method includes operating the battery cooler and operating the air conditioner in the defroster mode when the vehicle is moving in a case where a temperature of the battery is higher than a reference temperature, and operating the battery cooler and stopping the air conditioner when the vehicle is stopped in the case where the temperature of the battery is higher than the reference temperature.

With the above configuration (7), the cooling of the battery and the defrost function can be harmonized, as in the above configuration (1).

According to the above-mentioned aspects of the present disclosure, the cooling of the battery and the defrost function can be harmonized.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Hereinafter, an embodiment of the present disclosure will be described in detail with reference to the drawings. The same or corresponding portions are denoted by the same signs throughout the drawings, and description thereof will not be repeated.

Embodiment

Vehicle Configuration

Figure 1:
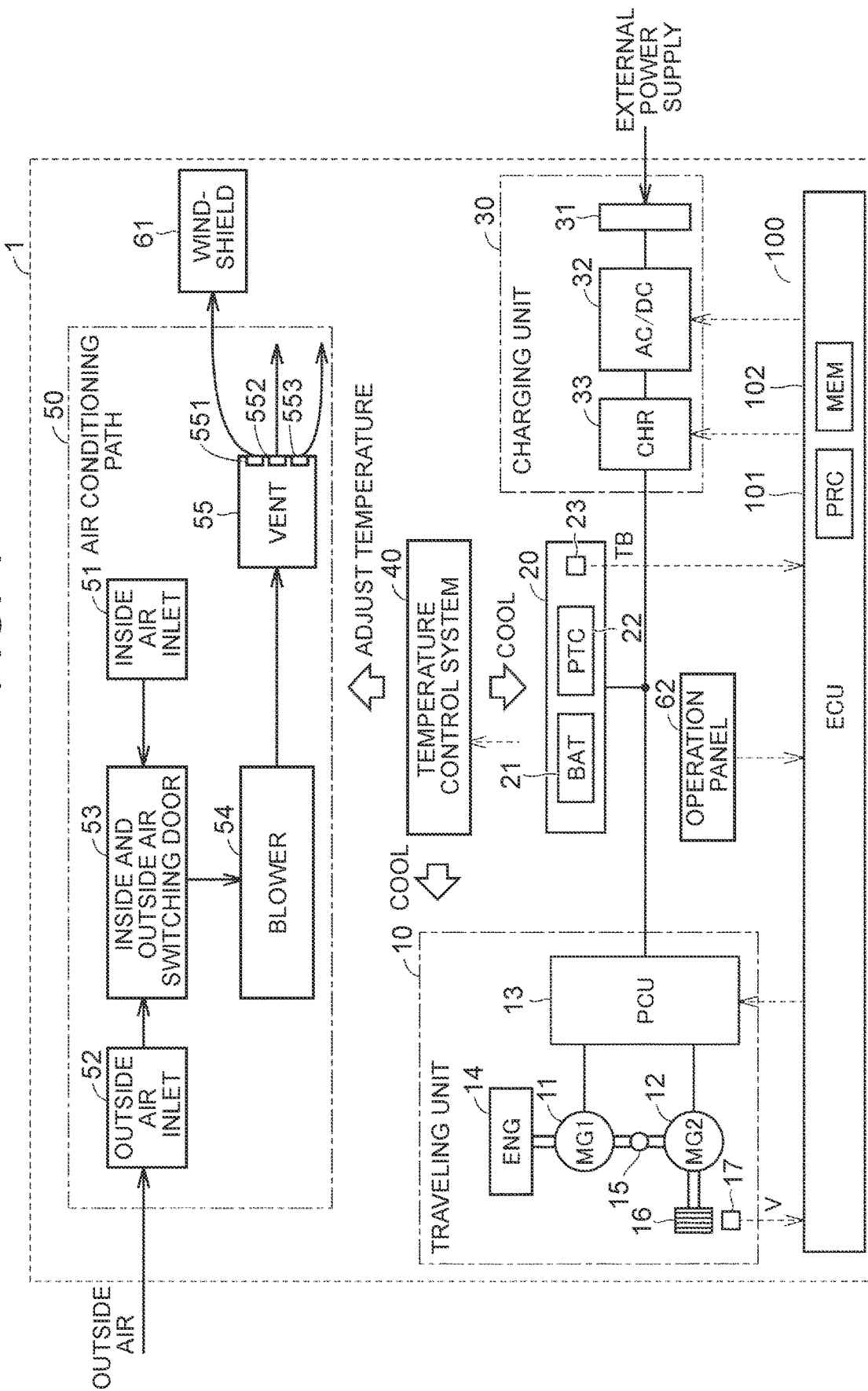
FIG. 1 shows an example of an overall configuration of a vehicle according to an embodiment of the present disclosure.

FIG. 1 shows an example of an overall configuration of a vehicle 1 according to an embodiment of the present disclosure. The vehicle 1 is, for example, a plug-in hybrid electric vehicle configured to be charged with electric power supplied from the outside of the vehicle 1 (plug-in charging). However, the vehicle 1 may be any vehicle equipped with a battery for traveling, and may be a regular hybrid electric vehicle that is not designed for plug-in charging. The vehicle 1 may be a battery electric vehicle or a fuel cell electric vehicle.

The vehicle 1 includes a traveling unit 10, a battery pack 20, a charging unit 30, a temperature control system 40, an air conditioning path 50, a windshield 61, an operation panel 62, and an electronic control unit (ECU) 100. The traveling unit 10 includes motor generators 11, 12, a power control unit (PCU) 13, an engine 14, a power split device 15, a drive wheel 16, and a vehicle speed sensor 17. The battery pack 20 includes a battery 21, an electric heater 22, and a battery temperature sensor 23. The charging unit 30 includes an inlet 31, an alternating current-to-direct current (AC-to-DC) converter 32, and a charge relay (CHR) 33. The air conditioning path 50 includes an inside air inlet 51, an outside air inlet 52, an inside and outside air switching door 53, a blower 54, and a vent 55.

Each of the motor generators 11, 12 is an alternating current (AC) rotating electrical machine and is, for example, a three-phase AC synchronous motor with permanent magnets embedded in a rotor. The motor generator 11 is mainly used as a generator that is driven by the engine 14 via the power split device 15. The electric power generated by the motor generator 11 is supplied to the motor generator 12 or the battery 21 via the PCU 13. The motor generator 11 can also crank the engine 14.

The motor generator 12 mainly operates as an electric motor and drives the drive wheel 16. The motor generator 12 is driven by at least one of the electric power from the battery 21 and the electric power generated by the motor generator 11. The driving force of the motor generator 12 is transmitted to a drive shaft. When braking the vehicle 1 or reducing acceleration on a downhill, the motor generator 12 operates as a generator to generate regenerative power. The electric power generated by the motor generator 12 is supplied to the battery 21 via the PCU 13.

The PCU 13 is configured to perform bidirectional power conversion between the battery 21 and the motor generator 11 and the motor generator 12 or between the motor generator 11 and the motor generator 12 according to a control command from the ECU 100.

The engine 14 outputs power by converting the combustion energy generated when an air-fuel mixture is burned to the kinetic energy of a mover (e.g., piston or rotor).

The power split device 15 is, for example, a planetary gear device. The power split device 15 includes a sun gear, a ring gear, a pinion gear, and a carrier, which are all not shown. The carrier is connected to the engine 14. The sun gear is connected to the motor generator 11. The ring gear is connected to the motor generator 12 and the drive wheel 16 via the drive shaft. The pinion gear meshes with the sun gear and the ring gear. The carrier holds the pinion gear such that the pinion gear can rotate and revolve.

The vehicle speed sensor (resolver) 17 calculates the traveling speed of the vehicle 1 by detecting the rotational speed of wheels such as the drive wheel 16. Hereinafter, the traveling speed of the vehicle 1 is also referred to as the "vehicle speed V." The vehicle speed sensor 17 outputs the vehicle speed V to the ECU 100.

The battery 21 is an assembled battery including a plurality of (typically several tens to several hundreds of) cells. Each cell is a secondary battery such as a lithium-ion battery or a nickel metal hydride battery. The battery 21 stores electric power for driving the motor generators 11, 12, and supplies the electric power to the motor generators 11, 12 through the PCU 13. The battery 21 is charged with the electric power generated by the motor generators 11, 12 and received through the PCU 13.

The electric heater 22 is, for example, a positive temperature coefficient (PTC) heater, and heats the battery 21 in a low temperature environment such as an environment below the freezing point.

The battery temperature sensor 23 detects the temperature of the battery 21 and outputs the detection result to the ECU 100. Hereinafter, the temperature detected by the battery temperature sensor 23 is also referred to as the "battery temperature TB."

The inlet 31 is configured such that a charging connector (not shown) of a charging cable can be inserted into the inlet 31 with mechanical connection such as fitting.

The AC-to-DC converter 32 is electrically connected between the inlet 31 and the charge relay 33. The AC-to-DC converter 32 converts alternating current (AC) power supplied from an external power supply (charging station etc.) via the inlet 31 to direct current (DC) power according to a control command from the ECU 100. A direct current-to-direct current (DC-to-DC) converter may be provided instead of, or in addition to, the AC-to-DC converter 32.

The charge relay 33 is electrically connected between the AC-to-DC converter 32 and the battery pack 20. When the charge relay 33 is closed in response to a control command from the ECU 100, electric power can be transmitted between the inlet 31 and the battery pack 20.

The temperature control system 40 is configured to cool the battery pack 20, cool the traveling unit 10 (specifically, the PCU 13 and a transaxle), and air-condition the vehicle 1 according to a control command from the ECU 100. An example of the configuration of the temperature control system 40 will be described in detail with reference to FIG. 2.

The air conditioning path 50 is a path in the vehicle 1 through which the air-conditioned air flows. When air-conditioning a vehicle cabin, the air inside the vehicle cabin (inside air) is taken in from the inside air inlet 51, or the air outside the vehicle 1 (outside air) is taken in from the outside air inlet 52. The air thus taken in passes through the inside and outside air switching door 53, and is then blown to an evaporator 75 (see FIG. 2) by the blower 54. The temperature of the air is adjusted in the evaporator 75. The air having passed through the evaporator 75 is blown out from the vent 55.

The vent 55 includes a defroster unit 551, a register unit 552, and a foot vent unit 553. The air from the defroster unit 551 is blown upward toward the windshield 61. The air from the defroster unit 551 may be blown to a side glass (not shown) in addition to the windshield 61. The air from the register unit 552 is blown toward the front of the vehicle 1. The air from the foot vent unit 553 is blown downward (toward feet). Although not shown in the figures, the air conditioning path 50 is provided with a unit configured to switch the vent from which the air-conditioned air is blown out. Therefore, the ECU 100 can control the air conditioning path 50 such that the air-conditioned air is blown out from a desired vent among the defroster unit 551, the register unit 552, and the foot vent unit 553.

The ECU 100 has a face mode, a foot mode, and a defroster mode as air conditioning operation modes. The face mode is the operation mode in which the ECU 100 controls the air conditioning path 50 such that the air-conditioned air is blown from the register unit 552 toward around the face or chest of a user sitting in a seat. The foot mode is the operation mode in which the ECU 100 controls the air conditioning path 50 such that the air-conditioned air is blown from the foot vent unit 553 toward the feet of the user. The defroster mode is selected when the windshield 61 tends to fog up (e.g., when the vehicle cabin is humid). In the defroster mode, the windshield 61 is dehumidified by the air blown from the defroster unit 551, whereby the windshield 61 can be defogged. The windshield 61 is an example of the "window glass" according to the present disclosure. The "window glass" according to the present disclosure is not limited to the windshield 61, and may be a side glass.

The operation panel 62 accepts user operations related to air conditioning of the vehicle cabin. By operating the operation panel 62, the user can switch the kind of air conditioning (heating operation, cooling operation, and ventilation operation), switch the air conditioning operation mode (vent), set the air conditioning strength (air volume), and adjust the temperature.

The ECU 100 includes a processor 101 such as a central processing unit (CPU), a memory 102 such as a read-only memory (ROM) and a random access memory (RAM), and an input and output (I/O) port (not shown) for inputting and outputting various signals. The ECU 100 controls the vehicle 1 to a desired state based on, for example, signals received from the sensors and programs and maps stored in the memory 102. An example of main control that is performed by the ECU 100 in the present embodiment is temperature adjustment control that is performed using the temperature control system 40. The temperature adjustment control will be described in detail later. The ECU 100 is an example of the "control unit" according to the present disclosure. The ECU 100 may be divided into a plurality of ECUs for each function.

Configuration of Temperature Control System

Figure 2:
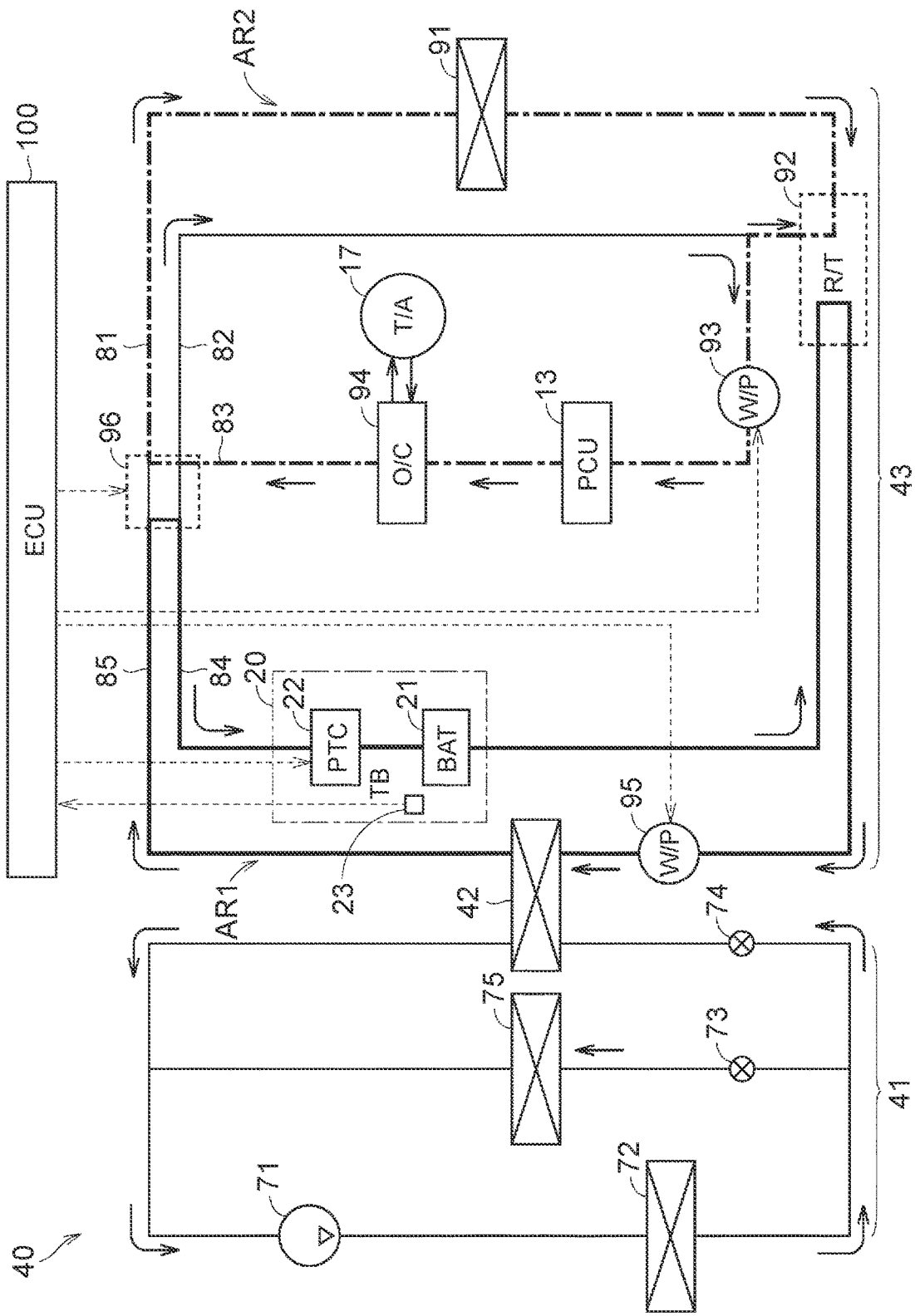
FIG. 2 shows an example of a configuration of a temperature control system.

FIG. 2 shows an example of the configuration of the temperature control system 40. FIG. 2 shows the battery pack 20, the PCU 13, and the ECU 100 in addition to the temperature control system 40. The temperature control system 40 includes a refrigerant circuit 41, a chiller 42, and a coolant circuit 43.

The refrigerant circuit 41 is a circuit for adjusting the temperature of a refrigerant (liquid phase refrigerant or gas phase refrigerant) circulating in the coolant circuit 43. The flow direction of the refrigerant is indicated by arrows. The refrigerant circuit 41 has, for example, a configuration equivalent to that of a commonly used heat pump system, and includes a compressor 71, a condenser 72, expansion valves 73, 74, and the evaporator 75. The cooling operation in the vehicle cabin will be described below as an example. The refrigerant circuit 41 and the air conditioning path 50 may be regarded as the "air conditioner" according to the present disclosure.

The compressor 71 compresses the gas phase refrigerant circulating in the refrigerant circuit 41. The gas phase refrigerant compressed to have a high temperature and high pressure by the compressor 71 is sent to the condenser 72.

The condenser 72 dissipates heat from the high-temperature, high-pressure gas phase refrigerant compressed by the compressor 71 to condense this gas phase refrigerant to a liquid phase.

The expansion valve 73 expands the high-pressure liquid phase refrigerant condensed by the condenser 72 to decompress this liquid phase refrigerant. The liquid phase refrigerant decompressed by the expansion valve 73 is sent to the evaporator 75.

Like the expansion valve 73, the expansion valve 74 expands the high-pressure liquid phase refrigerant condensed by the condenser 72 to decompress this liquid phase refrigerant. The liquid phase refrigerant decompressed by the expansion valve 74 is sent to the chiller 42.

The evaporator 75 performs heat exchange between the air blown to the evaporator 75 and the liquid phase refrigerant. The temperature of the air blown to the evaporator 75 is thus adjusted (reduced in the cooling operation). The liquid phase refrigerant absorbs the heat of the ambient air and vaporizes into a gas phase. This gas phase refrigerant returns to the compressor 71. The evaporator 75 is switched between the heating operation and the cooling operation by switching the output direction of the compressor 71.

The chiller 42 performs heat exchange between the refrigerant circulating in the refrigerant circuit 41 and the coolant circulating in the coolant circuit 43. More specifically, as the liquid phase refrigerant decompressed by the expansion valve 74 evaporates in the chiller 42, heat is taken from the coolant circulating in the coolant circuit 43. The coolant circulating in the coolant circuit 43 is thus cooled.

The coolant circuit 43 includes a cooling path including first to fifth paths 81 to 85, a radiator 91, a reserve tank (R/T) 92, a water pump (W/P) 93, an oil cooler (O/C) 94, a water pump (W/P) 95, and a five-way valve 96. The coolant circuit 43 is an example of the "battery cooler" according to the present disclosure.

The cooling path is a pipe that forms a flow path for the coolant. The coolant is, for example, a long life coolant (LLC) containing ethylene glycol etc. When the water pumps 93, 95 are driven in the coolant circuit 43, the coolant supplied from the water pumps 93, 95 passes through the battery pack 20, the PCU 13 or the radiator 91, etc. via the five-way valve 96, and then returns to the water pumps 93, 95. The coolant thus circulates in the cooling path. The circulation direction of the coolant is indicated by arrows. As described above, the cooling path includes the first to fifth paths 81 to 85.

The first path 81 connects the five-way valve 96 and the reserve tank 92. The radiator 91 is connected to the first path 81.

The second path 82 connects the five-way valve 96 and the reserve tank 92. No device such as the radiator 91 is connected to the second path 82, and the second path 82 is configured to bypass the radiator 91. The first path 81 and the second path 82 are connected in the reserve tank 92.

The third path 83 connects a portion of the second path 82 upstream of (before) the connection point of the second path 82 to the reserve tank 92, and the five-way valve 96. The water pump 93, the PCU 13, and the oil cooler 94 are connected to the third path 83.

The fourth path 84 connects the five-way valve 96 and the reserve tank 92. The electric heater 22 and the battery 21 are connected to the fourth path 84.

The fifth path 85 connects the reserve tank 92 and the five-way valve 96. The water pump 95 and the chiller 42 are connected to the fifth path 85. The fourth path 84 and the fifth path 85 are connected in the reserve tank 92.

The radiator 91 cools the coolant by performing heat exchange between the outside air of the vehicle 1 and the coolant. The reserve tank 92 stores the coolant in the cooling path.

The water pump 93 is an electric water pump and discharges the coolant according to a control command from the ECU 100. The PCU 13 is connected to a position downstream of the water pump 93 in the third path 83. The PCU 13 can be cooled by the coolant discharged from the water pump 93.

The oil cooler 94 is connected to a position downstream of the PCU 13 in the third path 83. Although not shown in the figure, an electric oil pump (EOP) is connected to the oil cooler 94. The oil cooler 94 cools the transaxle of the traveling unit 10 by performing heat exchange between the coolant flowing through the third path 83 and the oil cooler 94.

The water pump 95 is an electric water pump and discharges the coolant according to a control command from the ECU 100. The fourth path 84 is connected to the fifth path 85 at a position upstream of a portion to which the water pump 95 is connected. The electric heater 22 and the battery 21 that are located in the fourth path 84 can be cooled by driving the water pump 95.

The five-way valve 96 is configured to switch connection of the cooling path according to a control command from the ECU 100 such that the coolant input from at least one of the third path 83 and the fifth path 85 is output to at least one of the second path 82, the fourth path 84, and the first path 81. For example, a "battery cooling circuit" (see thick continuous line and arrow AR1) can be formed by switching the connection of the cooling path such that the coolant input from the fifth path 85 is output to the fourth path 84. A "radiator circuit" (see an alternate long and short dash line and arrow AR2) can be formed by switching the connection of the cooling path such that the coolant input from the third path 83 is output to the first path 81.

As described above, the temperature control system 40 is configured such that the coolant flowing through the coolant circuit 43 to cool the battery 21 is cooled by exchanging heat with the refrigerant flowing through the refrigerant circuit 41 via the chiller 42. Therefore, the cooling amount of the battery 21 may be affected by the air conditioning operation. Specifically, when the temperature of the refrigerant decreases during, for example, the cooling operation in the vehicle cabin and the temperature difference between the coolant and the refrigerant becomes small, the cooling amount of the battery 21 may decrease. Accordingly, in the present embodiment, the cooling of the battery 21 and the air conditioning operation (particularly the defrost function) are harmonized as follows. Hereinafter, the cooling amount (unit: W) of the battery 21 is also referred to as the "battery cooling amount."

Battery Cooling Levels

In the present embodiment, the degree of need to cool the battery 21 is divided into levels. Hereinafter, these levels will be referred to as the "battery cooling levels."

Figure 3:
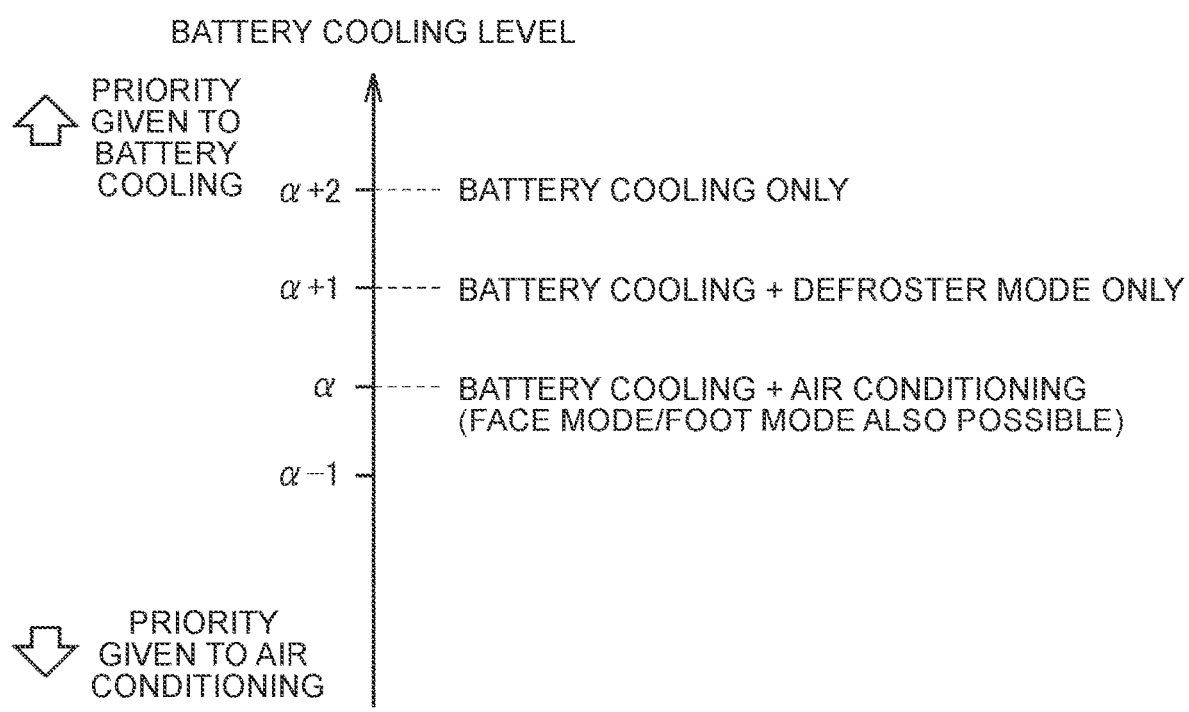
FIG. 3 schematically shows battery cooling levels in the embodiment.

FIG. 3 schematically shows the battery cooling levels in the present embodiment. As shown in FIG. 3, in this example, there are four or more battery cooling levels. As the battery cooling level becomes lower, the air conditioning of the vehicle cabin is more prioritized over the cooling of the battery 21 (i.e., a priority given to the air conditioning of the vehicle cabin becomes higher). That is, as the battery cooling level becomes higher, the cooling of the battery 21 is more prioritized over the air conditioning of the vehicle cabin (i.e., a priority given to the cooling of the battery 21 becomes higher).

When the battery temperature TB becomes excessively high while the vehicle 1 is moving, charging and discharging of the battery 21 is prohibited in order to protect the battery 21. As a result, the vehicle 1 may become unable to move. The case where the battery cooling level is α or higher (α is a natural number of 2 or more) corresponds to the state in which the battery 21 needs to be urgently cooled in order to avoid such a situation.

When the battery cooling level is α or higher, the ECU 100 controls the five-way valve 96 such that the battery cooling circuit shown in FIG. 2 (see arrow AR1) is formed and the radiator circuit (see arrow AR2) is not formed. When the battery cooling level is α or higher, the ECU 100 cancels any user operation (so-called manual operation) accepted by the operation panel 62 when the battery cooling level was lower than α. The ECU 100 then controls (automatically controls) the air conditioning of the vehicle cabin regardless of the user operation.

At the battery cooling level α, the ECU 100 controls the coolant circuit 43 so as to cool the battery 21, and also allows the air conditioning of the vehicle cabin using the refrigerant circuit 41. The air conditioning operation mode may be any of the face mode, the foot mode, and the defroster mode, or may be a combination of these modes. However, the ECU 100 reduces the amount of air conditioning (unit: W) of the vehicle cabin regardless of the user operation, as compared to the case where the battery cooling level is lower than α. For example, even when the user selected "air conditioning (strong)," the ECU 100 switches the air conditioning strength to "air conditioning (weak)" such that the battery cooling amount (unit: W) larger than a predetermined amount is provided by the coolant circuit 43.

When there is a defroster request at the battery cooling level (α+1), a priority is given to ensuring a sufficient amount of air conditioning in the defroster mode and providing clear visibility for the user. On the other hand, when there is no defroster request, the ECU 100 controls the coolant circuit 43 so as to maximize the battery cooling amount. At the battery cooling level ($\alpha$+1), the air conditioning operation mode is limited to the defroster mode.

At the battery cooling level ($\alpha$+2), the ECU 100 prohibits the air conditioning of the vehicle cabin using the refrigerant circuit 41. That is, the ECU 100 causes the temperature control system 40 to focus on the cooling of the battery 21. The largest battery cooling amount can thus be provided.

Hereinafter, the temperature adjustment control at the battery cooling levels $\alpha$ to ($\alpha$+2) will be described in detail. When the battery temperature TB becomes higher than T12 at the battery cooling level $\alpha$, the battery cooling level increases from $\alpha$ to ($\alpha$+1) or ($\alpha$+2). When the battery temperature TB falls below T11 at the battery cooling level ($\alpha$+1) or ($\alpha$+2), the battery cooling level decreases from ($\alpha$+1) or ($\alpha$+2) to $\alpha$. T11 is equal to or lower than T12. Switching between the battery cooling level ($\alpha$+1) and the battery cooling level ($\alpha$+2) is performed based on the vehicle speed V. More specifically, the battery cooling level is set to ($\alpha$+1) when the vehicle 1 is moving, and the battery cooling level is set to ($\alpha$+2) when the vehicle 1 is stopped.

Figure 4:
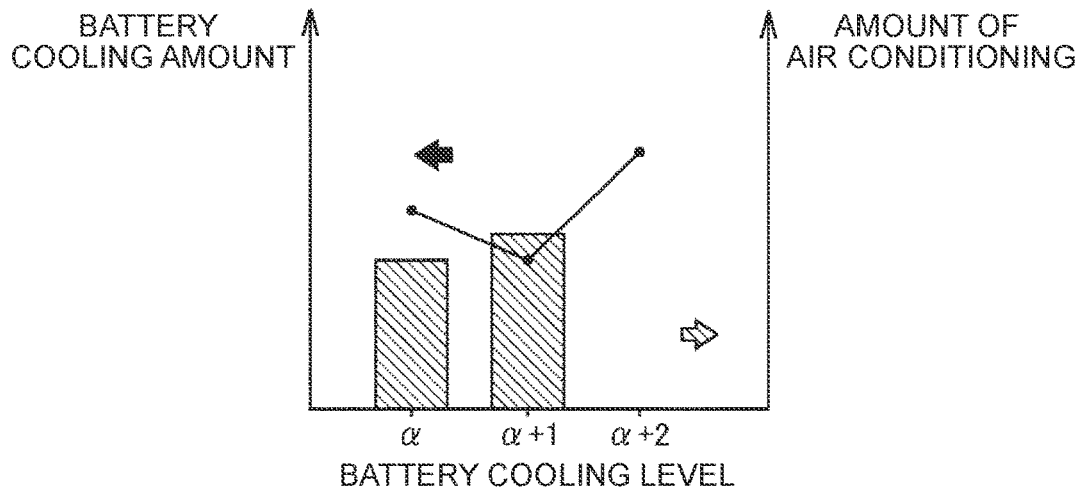
FIG. 4 shows graphs comparing the battery cooling amounts and the amounts of air conditioning at battery cooling levels α to (α+2)
Figure 4:
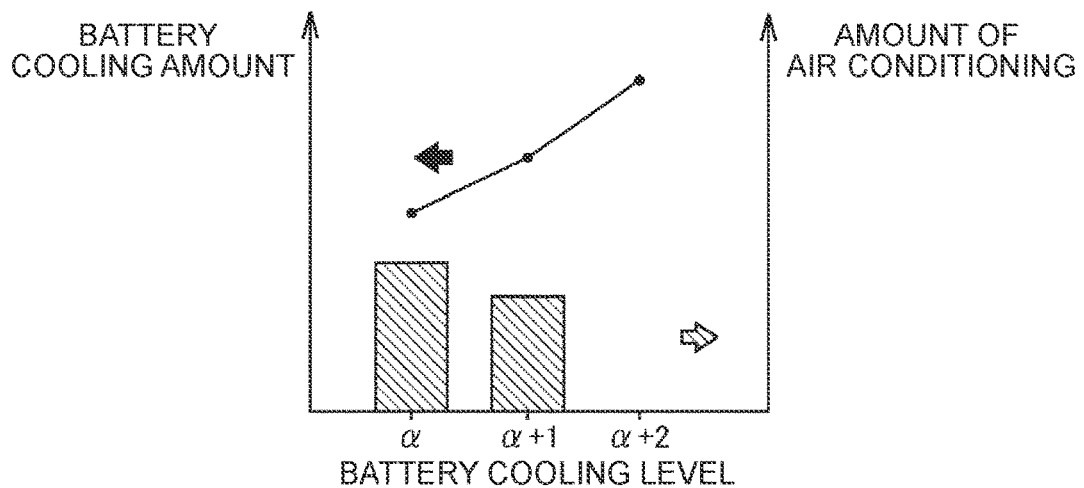
Figure 4:
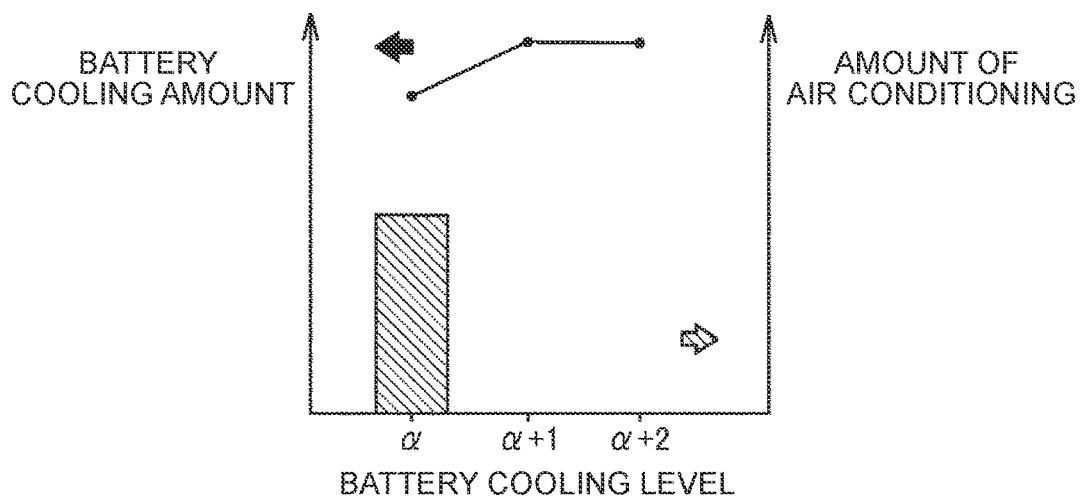

FIG. 4 shows graphs comparing the battery cooling amounts and the amounts of air conditioning of the vehicle cabin at the battery cooling levels $\alpha$ to ($\alpha$+2). In FIG. 4, the line graph indicates the battery cooling amounts, and the bar graph indicates the amounts of air conditioning. In both cases with and without a defroster request, the battery cooling amount at the battery cooling level ($\alpha$+2) is equal to or larger than the battery cooling amount at the battery cooling level ($\alpha$+1). The battery cooling amount at the battery cooling level ($\alpha$+1) depends on whether there is a defroster request. When there is a defroster request, the amount of air conditioning at the battery cooling level ($\alpha$+1) may vary depending on the defroster requirement. When, for example, there is a defroster request and the amount of air conditioning is large, the battery cooling amount at the battery cooling level ($\alpha$+1) may be smaller than the battery cooling amount at the battery cooling level $\alpha$. When, for example, there is a defroster request but the amount of air conditioning is small, the battery cooling amount at the battery cooling level ($\alpha$+1) may be larger than the battery cooling amount at the battery cooling level $\alpha$.

When there is no defroster request, the amount of air conditioning at the battery cooling level ($\alpha$+2) is equal to or smaller than the amount of air conditioning at the battery cooling level ($\alpha$+1). The amount of air conditioning at the battery cooling level ($\alpha$+1) is equal to or smaller than the amount of air conditioning at the battery cooling level $\alpha$. That is, when there is no defroster request, as the battery cooling level becomes higher, the amount of air conditioning becomes smaller.

By controlling the expansion valves 73, 74, the ECU 100 can adjust the ratio between the liquid phase refrigerant to be sent to the evaporator 75 and the liquid phase refrigerant to be sent to the chiller 42, and can thus adjust the battery cooling amount and the amount of air conditioning. When the battery cooling level is set to ($\alpha$+2), the ECU 100 can close the expansion valve 73 such that the liquid phase refrigerant is not sent to the evaporator 75. As a result, all the liquid phase refrigerant is sent to the chiller 42, whereby the amount of heat exchange in the chiller 42 can be maximized and therefore the battery cooling amount can be maximized. When the battery cooling level is set to ($\alpha$+1), the ECU 100 can control the expansion valves 73, 74 such that only a part of the liquid phase refrigerant is sent to the evaporator 75 and most of the liquid phase refrigerant is sent to the chiller 42. This can increase the amount of heat exchange in the chiller 42 while allowing the operation in the defroster mode. As a result, a sufficiently large battery cooling amount can be provided, although the maximum battery cooling amount is not provided.

As described above, when the vehicle 1 is moving, the ECU 100 sets the battery cooling level to ($\alpha$+1) to turn on the defrost function (dehumidifying function or moisture-proof function) for the vehicle cabin. This ensures a large battery cooling amount while providing sufficient visibility for the user (driver) of the vehicle 1. On the other hand, when the vehicle 1 is stopped, the ECU 100 does not need to consider ensuring visibility. Therefore, the ECU 100 sets the battery cooling level to ($\alpha$+2) to turn off the defrost function for the vehicle cabin. As a result, the battery 21 can be cooled by a larger battery cooling amount than when the battery cooling level is set to ($\alpha$+1).

Processing Flow

Figure 5:
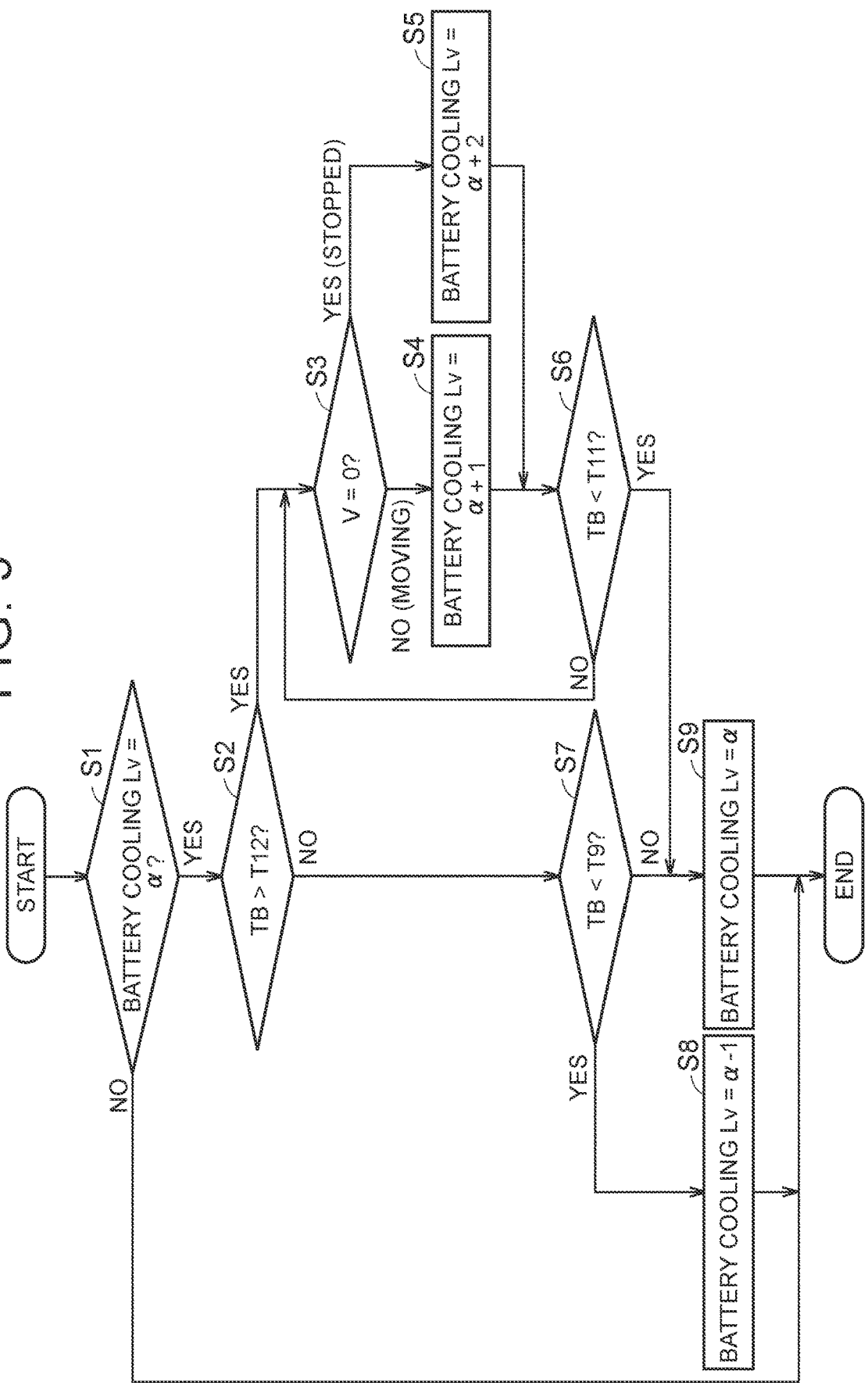
FIG. 5 is a flowchart of a processing procedure of temperature adjustment control in the embodiment.

FIG. 5 is a flowchart of a processing procedure of the temperature adjustment control in the present embodiment. The routine of this flowchart is called from a main routine (not shown) and executed in, for example, predetermined cycles. The steps are implemented by software processing by the ECU 100. However, the steps may be implemented by hardware (electric circuit) in the ECU 100. Hereinafter, the term "step" is abbreviated as S.

In S1, the ECU 100 determines whether the battery cooling level (may be referred to as the battery cooling Lv) is $\alpha$. When the current battery cooling level is not $\alpha$ (NO in S1), the ECU 100 skips the subsequent steps, and the routine returns to the main routine. When the battery cooling level is $\alpha$ (YES in S1), the ECU 100 proceeds to S2.

In S2, the ECU 100 determines whether the battery temperature TB acquired from the battery temperature sensor 23 is higher than T12. When the battery temperature TB is higher than T12 (YES in S2), the ECU 100 proceeds to S3, and the ECU 100 determines whether the vehicle speed V acquired from the vehicle speed sensor 17 is 0 km/h.

When the vehicle speed V is not 0 km/h (NO in S3), that is, when the vehicle 1 is moving, the ECU 100 sets (maintains or changes) the battery cooling level to ($\alpha$+1) (S4). Thus, it is possible to perform the defrost function in the vehicle cabin while providing the battery cooling amount between the value when the battery cooling level is set to $\alpha$ and the value when the battery cooling level is set to ($\alpha$+2).

The ECU 100 may consider the shift range and the parking brake operation instead of, or in addition to, the vehicle speed V detected by the vehicle speed sensor 17. More specifically, the ECU 100 can determine that the vehicle 1 is stopped, when the shift range is a parking (P) range or when the parking brake is on. The ECU 100 can determine that the vehicle 1 is moving, when the shift range is a traveling range such as a drive (D) range or the parking brake is off.

After S4 or S5, the ECU 100 determines whether the battery temperature TB is lower than T11 (S6). When the battery temperature TB is T11 or higher (NO in S6), the ECU 100 returns to S3. As a result, the battery cooling level ($\alpha$+1) or ($\alpha$+2) is maintained. On the other hand, when the battery temperature TB is lower than T11 (YES in S6), the ECU 100 lowers the battery cooling level from ($\alpha$+1) or ($\alpha$+2) to $\alpha$ (S9). As a result, the battery cooling amount becomes smaller than when the battery cooling level is set to ($\alpha$+1) or ($\alpha$+2), and the air conditioning operation in the operation mode (face mode and/or foot mode) other than the defroster mode can be performed (i.e., the air conditioning operation in the operation mode other than the defroster mode is enabled).

When the battery temperature TB is T12 or lower at the battery cooling level α (NO in S2), the ECU 100 proceeds to S7, and the ECU 100 determines whether the battery temperature TB is lower than T9. T9 is equal to or lower than T12. When the battery temperature TB is lower than T9 (YES in S7), the ECU 100 lowers the battery cooling level from α to (α−1) (S8). A manual air conditioning operation can be performed (i.e., a manual air conditioning operation is enabled) at the battery cooling level (α−1). When the battery temperature TB is T9 or higher (NO in S7), the ECU 100 maintains the battery cooling level α (S9).

As described above, in the present embodiment, the battery cooling level is set to (α+1) when the vehicle 1 is moving. As a result, the air conditioning operation in the face mode or foot mode is prohibited, and the air conditioning operation in the defroster mode is permitted while a certain battery cooling amount is provided. This can ensure sufficient visibility for the user of the vehicle 1. On the other hand, the battery cooling level is set to (α+2) when the vehicle 1 is stopped. As a result, the air conditioning in the vehicle cabin is completely stopped, whereby a larger battery cooling amount can be ensured than when the battery cooling level is set to (α+1). According to the present embodiment, the cooling of the battery 21 and the defrost function can be harmonized.

In the present embodiment, when the battery cooling level is set to α, the air conditioning operation in the face mode or foot mode is permitted. Accordingly, the comfort of the user in the vehicle cabin can be improved, although the battery cooling amount is smaller than when the battery cooling level is set to (α+1) or (α+2).

The embodiment disclosed herein shall be construed as illustrative and not restrictive in all respects. The scope of the present disclosure is intended to include all modifications within the meaning and scope equivalent to those of the claims.

What is claimed is:

1. A vehicle comprising:
a battery for traveling;
an air conditioner that includes a defroster mode in which air-conditioned air is blown toward a window glass, the air conditioner being configured to air-condition a vehicle cabin using a refrigeration cycle;
a battery cooler configured to cool the battery with a coolant that is cooled by heat exchange with a refrigerant flowing through the air conditioner; and
a control unit configured to control the air conditioner and the battery cooler, wherein in a case where a temperature of the battery is higher than a reference temperature, the control unit operates the battery cooler and controls the air conditioner such that the air conditioner operates in the defroster mode when the vehicle is moving, and the control unit operates the battery cooler and stops the air conditioner when the vehicle is stopped.

2. The vehicle according to claim 1, wherein:
in the case where the temperature of the battery is higher than the reference temperature, the control unit sets a cooling amount of the battery cooled by the battery cooler to a first cooling amount when the vehicle is moving, and sets the cooling amount of the battery cooled by the battery cooler to a second cooling amount when the vehicle is stopped; and
the second cooling amount is larger than the first cooling amount.

3. The vehicle according to claim 2, wherein:
when the temperature of the battery is lower than the reference temperature, the control unit sets the cooling amount of the battery cooled by the battery cooler to a third cooling amount; and
the first cooling amount is larger than the third cooling amount.

4. The vehicle according to claim 1, further comprising an operation panel that accepts a user operation of selecting an operation mode of the air conditioner, wherein when the temperature of the battery is higher than the reference temperature, the control unit controls the air conditioner regardless of the user operation accepted by the operation panel.

5. The vehicle according to claim 1, wherein:
the air conditioner further includes at least one operation mode other than the defroster mode; and
in the case where the temperature of the battery is higher than the reference temperature, when the vehicle is moving, the control unit operates the air conditioner in the defroster mode and prohibits operation of the air conditioner in the at least one operation mode.

6. The vehicle according to claim 5, wherein:
the at least one operation mode includes a face mode in which the air-conditioned air is blown toward a position of a face or a chest of a user sitting in a seat, and a foot mode in which the air-conditioned air is blown toward feet of the user; and
when the temperature of the battery is lower than the reference temperature, the control unit allows operation of the air conditioner in the face mode or the foot mode in addition to the defroster mode.

7. A method for controlling a vehicle, the vehicle including
a battery for traveling,
an air conditioner that includes a defroster mode in which air-conditioned air is blown toward a window glass, the air conditioner being configured to air-condition a vehicle cabin using a refrigeration cycle, and
a battery cooler configured to cool the battery with a coolant that is cooled by heat exchange with a refrigerant flowing through the air conditioner, the method comprising:
determining whether the vehicle is moving or stopped;
determining whether a temperature of the battery is higher than a reference temperature;
operating the battery cooler and operating the air conditioner in the defroster mode based on a determination that the vehicle is moving and a determination that the temperature of the battery is higher than the reference temperature; and
operating the battery cooler and stopping the air conditioner based on a determination that the vehicle is stopped and the determination that the temperature of the battery is higher than the reference temperature.

\* \* \* \* \*